US009396552B1

(12) United States Patent
Kloer (10) Patent No.: US 9,396,552 B1
(45) Date of Patent: Jul. 19, 2016

(54) IMAGE CHANGE DETECTION (71) Applicant: Intergraph Corporation, Madison, AL (US)

(72) Inventor: Brian R. Kloer, Norcross, GA (US)

(73) Assignee: Intergraph Corporation, Madison, AL (US)

(*) Notice: Subject to any disclaimer, the term of this patent is extended or adjusted under 35 U.S.C. 154(b) by 0 days.

(21) Appl. No.: 14/738,374

(22) Filed: Jun. 12, 2015

(51) Int. Cl.
| G06K 9/00 | (2006.01) |
| G06T 7/40 | (2006.01) |
| G06T 7/00 | (2006.01) |
| G06T 11/60 | (2006.01) |
| G06Q 40/00 | (2012.01) |

(52) U.S. Cl.
CPC .............. *G06T 7/408* (2013.01); *G06K 9/0063* (2013.01); *G06Q 40/10* (2013.01); *G06T 7/0081* (2013.01); *G06T 11/60* (2013.01); *G06T 2207/10024* (2013.01); *G06T 2207/30184* (2013.01)

(58) Field of Classification Search
CPC ................... G06T 7/0081; G06T 7/408; G06T 2207/10024; G06T 3/4038; G06T 5/50; G06T 11/60; G06K 9/4652; H04N 1/3876; H04N 5/23238
See application file for complete search history.

(56) References Cited

U.S. PATENT DOCUMENTS

| 8,477,149 B2* | 7/2013 | Beato ................... G06K 9/4652 |
| | | 345/592 |
| 8,917,910 B2* | 12/2014 | Rodriguez Serrano .. G06K 9/34 |
| | | 382/105 |
| 9,299,004 B2* | 3/2016 | Lin ....................... G06K 9/4671 |
| 9,299,130 B2* | 3/2016 | Panetta .................... G06T 5/002 |
| 2005/0111754 A1* | 5/2005 | Cakir .................... G06K 9/6293 |
| | | 382/284 |
| 2012/0092359 A1* | 4/2012 | O'Brien-Strain ...... H04N 1/644 |
| | | 345/589 |
| 2012/0120304 A1* | 5/2012 | Corcoran ........... G06K 9/00228 |
| | | 348/349 |

(Continued)

FOREIGN PATENT DOCUMENTS

WO 2006/113582 A2 10/2006 ............... H04N 5/14

OTHER PUBLICATIONS

Celik, "Unsupervised Change Detection in Satellite Images Using Principal Component Analysis and κ-Means Clustering," IEEE Geoscience and Remote Sensing Letters, vol. 6, No. 4, pp. 772-776, Oct. 1, 2009.

(Continued)

*Primary Examiner* — Amir Alavi
(74) *Attorney, Agent, or Firm* — Sunstein Kann Murphy & Timbers LLP (57) ABSTRACT

A system, method, and computer program product compare images of a physical activity or object. Pixel data from first and second registered color images defined in an N-dimensional color model are concatenated to form an image in a 2N-dimensional color model. Principal component analysis is performed on the composite image and those components representing a change rather than a correlation are identified. In the composite image, coordinates for each pixel are determined along the principal components representing change, and a normalized pixel change value is computed. Pixels in the composite image may be segmented according to their respective normalized pixel change values, where segments do not cross pre-defined geospatial parcel boundaries. Parcel change probabilities are calculated as a function of segment change probabilities, themselves functions of the normalized pixel change values. Finally, parcels are ranked by their change probabilities and highlighted in a graphical user interface.

29 Claims, 9 Drawing Sheets

(56) References Cited

U.S. PATENT DOCUMENTS

| 2012/0183213 | A1* | 7/2012 | Robles-Kelly | G06K 9/00362 |
| | | | | 382/165 |
| 2012/0219229 | A1* | 8/2012 | Springer | G06T 5/003 |
| | | | | 382/199 |

OTHER PUBLICATIONS

Deng et al., "PCA-based land-use change detection and analysis using multitemporal and multisensor satellite data," International Journal of Remote Sensing, vol. 29, No. 16, pp. 4823-4838, Aug. 20, 2008.

Du et al., "Fusion of Difference Images for Change Detection Over Urban Areas," IEEE Journal of Selected Topics in Applied Earth Observations and Remote Sensing, vol. 5, No. 4, pp. 1076-1086, Aug. 2012.

International Searching Authority, International Search Report—International Application No. PCT/US2015/035648, dated Feb. 23, 2016, together with the Written Opinion of the International Searching Authority, 12 pages.

* cited by examiner

FIG. 9

IMAGE CHANGE DETECTION

TECHNICAL FIELD

The present invention relates to color image processing, and more particularly to segmentation of an image to determine a list of segments ranked according to likelihood of change.

BACKGROUND ART

Property taxes are an important revenue raising tool for municipalities such as cities and towns. Tax assessment is a method of allocating property taxes between individuals owning real estate in the municipality. Tax allocation using the assessment method generally works according to the following process. First, each parcel of real estate within the municipality is "assessed"—that is, assigned a relative value for the limited purpose of collecting a property tax. Next, the total assessed value for the municipality is calculated by summing the assessed values for all parcels. Finally, the property tax to be levied on each parcel is allocated by multiplying each respective parcel's fraction of the total assessed value by the total property tax to be raised. As may be appreciated from this description, an assessed property value need have no relation with the market value of the property, so long as all assessed values are appropriately determined relative to each other. An assessed value therefore represents the relative value of a parcel of real estate with respect to its neighbors.

Fairness in allocating the tax burden requires that parcels be reassessed on a regular basis to capture increases and decreases of their relative values. However, determining which parcels have been improved and the extent of the improvements may be a difficult, expensive, and time-consuming job, especially if it must be undertaken by individual tax assessors physically viewing every parcel in the municipality. One tool that can simplify the process is remote sensing. Remote sensing, in this context, means obtaining aerial or satellite imagery of a municipality at multiple times. A tax assessor may determine which properties have been improved over a relevant assessment period by comparing a "before" image captured at a time when a prior tax assessment was made, with an "after" image captured more recently for which a reassessment must be made. While side-by-side visual image comparison may be a valuable tool, nevertheless it can be mentally taxing, as many parcels look nearly identical, especially those in a development or sub-development that are laid out to provide a uniform appearance. Therefore, automated image analysis may be employed.

Image analysis is the process of extracting meaningful information from images. One type of image analysis particularly useful in this context is geographic object-based image analysis (GEOBIA). Digital images are formed from pixels; GEOBIA takes those pixels and performs two main processes, segmentation and classification. Image segmentation is the process of partitioning a digital image into segments, each of which is formed from multiple pixels having a common characteristic such as color or brightness. Such segments therefore represent a type of land cover; that is, grass, asphalt, trees, dirt, water, and so on. Statistics may then be applied to the segments to classify each segment by the type of land cover it represents.

However, image analysis is required to extract information that is meaningful, which in the remote sensing context includes changes to parcels that affect the assessed value, such as the addition of a rooftop solar photovoltaic system or an in-ground swimming pool. Meaningful information does not include changes between the images that are caused by transient phenomena, such as shadows, differences in lighting generally, the presence or absence of people, automobiles, other movable objects, and so on. Distinguishing between these types of changes is, in general, a very hard problem, and existing segmentation and classification software suffers from a variety of problems distinguishing meaningful segments from meaningless segments, especially in the context of performing a tax assessment.

SUMMARY OF THE EMBODIMENTS

In accordance with various embodiments of the invention, a system, method, and computer program product compare images of a physical activity or object. Pixel data from first and second registered color images defined in an N-dimensional color model are concatenated to form an image in a 2N-dimensional color model. Principal component analysis is performed on the composite image and those components representing a change rather than a correlation are identified. In the composite image, coordinates for each pixel are determined along the principal components representing change, and a normalized pixel change value is computed. In connection with performing a tax assessment specifically, pixels in the composite image are segmented according to their respective normalized pixel change values, where segments do not cross pre-defined geospatial parcel boundaries. Parcel change probabilities are calculated as a function of segment change probabilities, themselves functions of the normalized pixel change values. Finally, parcels are ranked by their change probabilities and highlighted in a graphical user interface.

Thus, a first embodiment of the invention provides a method of comparing first and second digital color images having registered pixels, each pixel having data for N colors, the first digital color image having an appearance of a physical activity or object at a first time, the second digital color image having an appearance of the physical activity or object at a second time. The method has four processes. The first process is forming a composite image having pixels in a 2N-dimensional color model by defining color data for each pixel in the composite image as a concatenation of the color data for a pixel in the first digital color image with the color data for a registered pixel in the second digital color image. The second process is determining a set of principal components of the composite image using a principal component analysis, the set of principal components defining a coordinate system in the 2N-dimensional color model. The third process is selecting a subset of principal components in the coordinate system as those principle components that each represent a difference, rather than a correlation, between the first digital color image and the second digital color image. The fourth process is, for each pixel in the composite image, computing a normalized pixel change value as a function of the coordinates of the pixel color data along each principal component in the subset, the normalized pixel change values collectively defining a change image having a one-dimensional color model, the computed normalized pixel change value for each pixel measuring a change in the physical activity or object between the first time and the second time.

Various refinements of the basic method are contemplated. In one embodiment, N=3 and each pixel has red, green, and blue (RGB) color data. In another embodiment, N=4 and each pixel has red, green, blue, and infrared (RGB IR) color data. In yet another embodiment, selecting the subset of principal components comprises, for each principal component of the composite image, (a) forming an N-dimensional difference vector by subtracting a first N-dimensional portion of the principal component that represents the first digital color image from a second N-dimensional portion of the principal component that represents the second digital color image, and (b) selecting the principal component for inclusion in the subset if and only if the N-dimensional length of the difference vector is greater than a given length. In still another embodiment, the normalized pixel change value for each pixel is computed to be the maximum of the coordinates of the color data of the pixel along each principal component in the subset. A further embodiment requires, prior to determining the set of principal components of the composite image, removing from the composite image those pixels having a brightness that is less than a shadow threshold value.

The method may be particularly applied to performing a tax assessment. In this case, the physical activity or object is a municipality, the first digital color image represents an appearance of the municipality at a first time, the second digital color image represents an appearance of the municipality at a second time, and the municipality is divided into a plurality of parcels. The method may further include four additional processes. The first additional process is dividing the change image into a plurality of segments, wherein (a) each given segment in the plurality of segments is formed from contiguous pixels and lies entirely within a parcel in the plurality of parcels, and (b) membership, in the given segment, of each pixel is determined as a function of its normalized pixel change value. The second additional process is computing, for each segment in the plurality of segments, a segment change probability as a function of the normalized pixel change values of the pixels that form it. The third additional process is computing, for each parcel in the plurality of parcels, a parcel change probability as a function of the segment change probabilities of the segments that lie within it. The fourth additional process is ranking the parcels in the plurality of parcels according to their respective parcel change probabilities.

Various refinements of the tax assessment application are contemplated. In one embodiment, the first digital color image and the second digital color image represent appearances of the municipality that are approximately a whole number of years apart. In another embodiment, the segment change probability for each segment in the plurality of segments is computed to be the average of the normalized pixel change values of the pixels that form it. Yet another embodiment requires, prior to computing the parcel change probability, eliminating segments that have a segment change probability below a segment change threshold value. An additional embodiment requires, prior to computing the parcel change probability, eliminating segments that consist of a number of pixels representing an area having a number of square feet below a segment size threshold value. In still another embodiment, the parcel change probability for each parcel in the plurality of parcels is computed as the sum, over each segment that lies within the given parcel, of the product of the segment change probability of the given segment and the ratio between the number of pixels in the given segment and the number of pixels in the parcel that contains the given segment.

The tax assessment method may further include providing a graphical user interface (GUI) for a computer system, the GUI displaying a portion of the first digital color image next to a corresponding portion of the second digital color image to permit visual comparison of the portions by a user of the computer system. In this case, the method may also include simultaneously displaying in the GUI (a) a distinctive outline of a parcel within the portion of the first digital color image, (b) a distinctive outline of the parcel within the corresponding portion of the second digital color image, and (c) a control for receiving a selection indicating that the parcel has meaningfully changed, has not meaningfully changed, or requires further analysis. Alternately or in addition, the method may include providing in the GUI a control that permits the user to adjust a shadow threshold value, a segment change threshold value, or a segment size threshold value.

Also contemplated is a non-transitory, tangible computer readable storage medium on which is stored computer program code for performing the above-described method or any of its refinements.

Further contemplated is a computer system with a volatile memory having stored within it computer program code for performing the above-described method or any of its refinements. The computer system also may include a microprocessor, coupled to the volatile memory, configured to execute the computer code stored in the volatile memory; one or more output interfaces, coupled to the microprocessor, for providing a graphical user interface that displays a portion of the first digital color image next to a corresponding portion of the second digital color image to permit visual comparison of the portions by a user of the computer system; and one or more input interfaces, coupled to the microprocessor, for receiving a selection indicating that the displayed portions have meaningfully changed, have not meaningfully changed, or require further analysis.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

In accordance with various embodiments of the invention, a system, method, and computer program product compare images of a physical activity or object. Pixel data from first and second registered color images defined in an N-dimensional color model are concatenated to form an image in a 2N-dimensional color model. Principal component analysis is performed on the composite image and those components representing a change rather than a correlation are identified. In the composite image, coordinates for each pixel are determined along the principal components representing change, and a normalized pixel change value is computed. In connection with performing a tax assessment specifically, pixels in the composite image are segmented according to their respective normalized pixel change values, where segments do not cross pre-defined geospatial parcel boundaries. Parcel change probabilities are calculated as a function of segment change probabilities, themselves functions of the normalized pixel change values. Finally, parcels are ranked by their change probabilities and highlighted in a graphical user interface.

DEFINITIONS

As used in this description and the accompanying claims, the following terms shall have the meanings indicated, unless the context otherwise requires:

A "municipality" is any polity that funds its operations at least in part by collecting taxes on real estate contained within its boundaries. A "parcel" is real estate in a municipality that is assessed a taxable value to facilitate such funding.

A "color space" is a specific organization of colors. A "color model" is a mathematical model describing the way colors in a color space can be represented as tuples of numbers, each tuple representing a color or combination of colors.

"Concatenation" of color data means appending, to a first vector of tuples, a second vector of tuples, thereby producing a third vector of tuples having a length equal to the sum of the lengths of the first and second vectors.

"Principal component analysis" of data within a vector space means a process for determining an orthogonal transformation that rotates a coordinate system of the vector space such that the greatest variance (width) of the data occurs along the first rotated axis (called the first "principal component"), the second greatest variance of the data occurs along the second rotated axis (the second "principal component"), and so on. Principal component analysis has a variety of different names in various fields: in mechanical engineering it is called the proper orthogonal decomposition; in linear algebra it is the singular value decomposition or eigenvalue decomposition of a matrix; in signal processing it is essentially the transform of the Karhunen-Loève Theorem; and in statistics it is the canonical (auto)correlation analysis of a single dataset, among many other names and applications.

"Segmenting" a digital image means the process of partitioning the pixels of the image into contiguous groups, the pixels of each such group possessing a common, desired property such as, without limitation, color, intensity, or texture.

Figure 1:
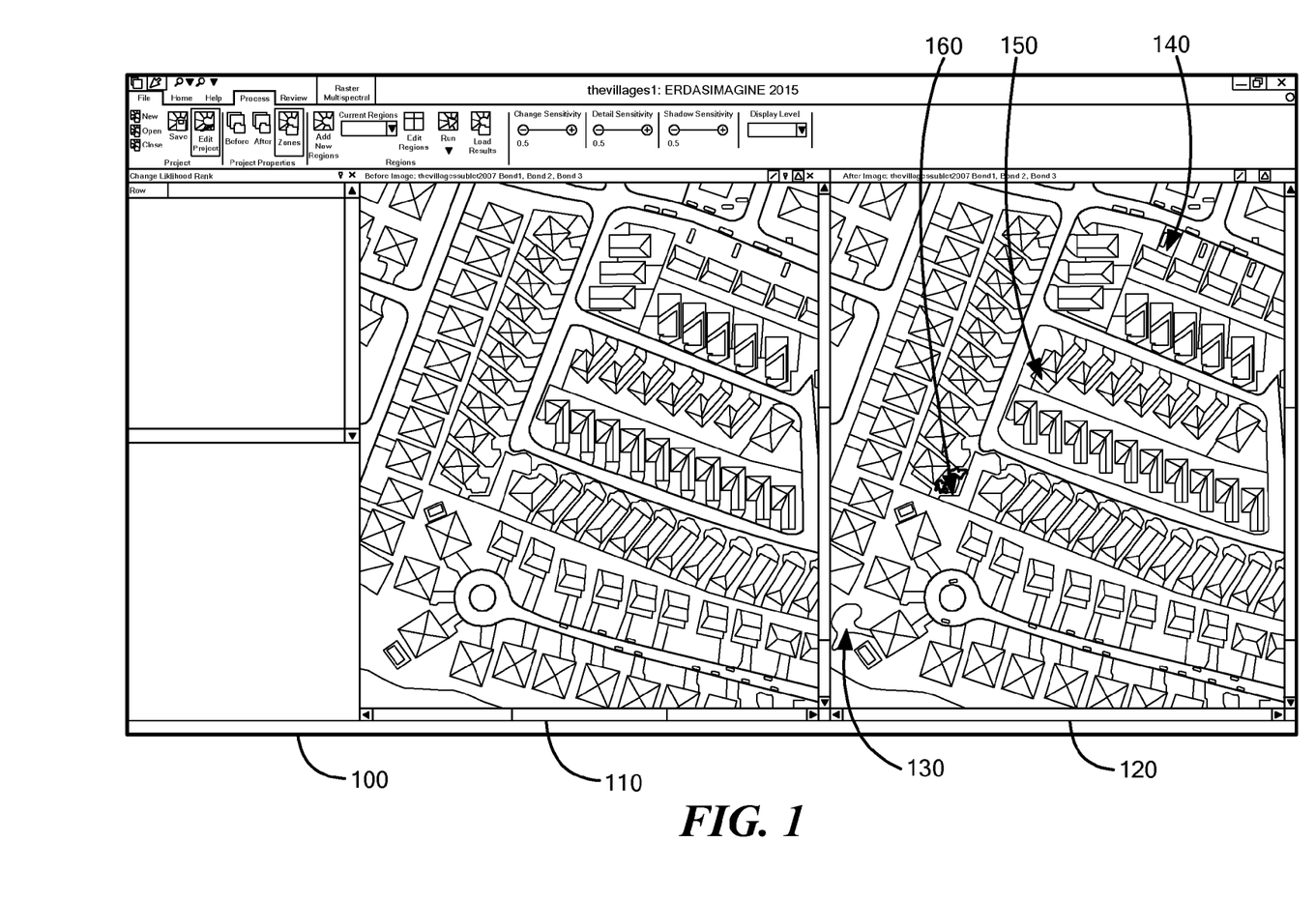
FIG. 1 is a representation of a graphical user interface (GUI) for performing a tax assessment according to an embodiment of the invention.

FIG. 1 is a representation of a graphical user interface (GUI) 100 for performing a tax assessment according to one embodiment of the invention. The GUI 100 is used to compare a "before" image 110 and an "after" image 120 for changes to parcels that might impact a tax assessment value. One such meaningful change is a new paved area 130, in the rear of the parcel (when viewed from the street). Another is indicated by a finished driveway 140, which shows that construction on certain houses has been completed. Yet another is an addition 150 on a house. An example of a change that may not affect a tax assessment is indicated by new landscaping 160. While the GUI 100 of FIG. 1 shows only a small number of parcels in a municipality, it should be appreciated that software implementing such a GUI may include controls for permitting a user to display all of, or only a portion of, a municipality.

Figure 2:
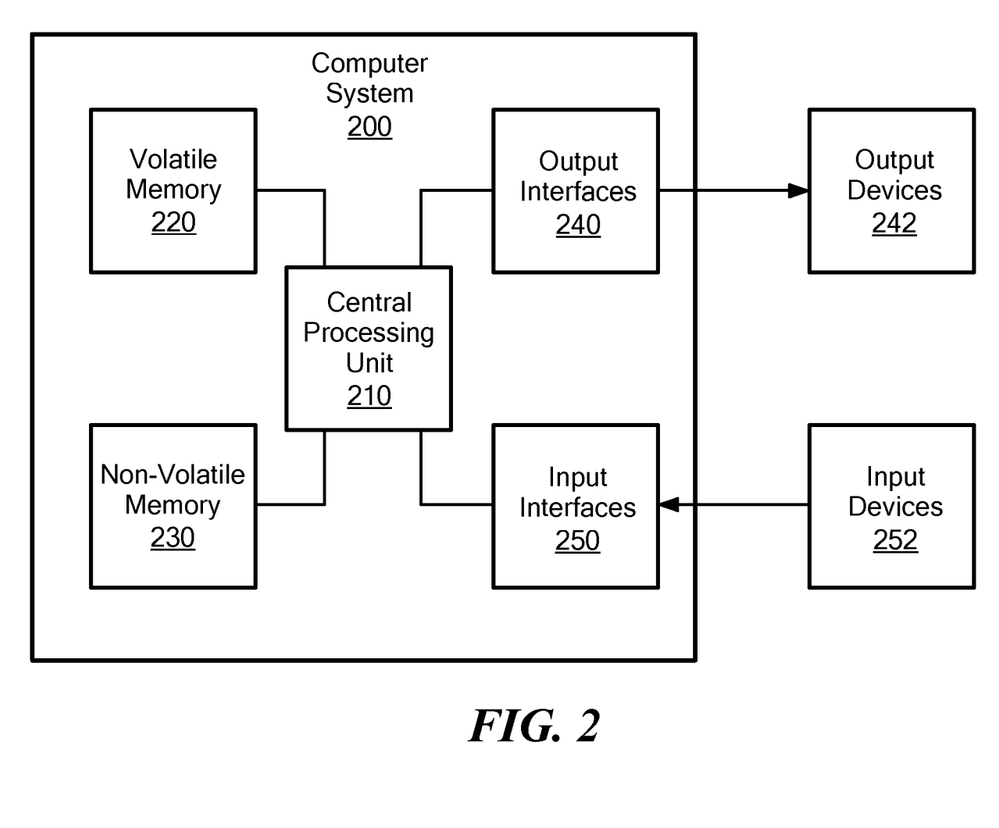
FIG. 2 is a schematic representation of a computer system for performing a tax assessment according to an embodiment of the invention.

FIG. 2 is a schematic representation of a computer system 200 for performing a tax assessment according to an embodiment of the invention. The computer system 200 of FIG. 2 is conventional, although persons having ordinary skill in the art will appreciate that other types of computer systems may be used in accordance with various embodiments of the invention.

The computer system 200 includes a central processing unit (CPU) 210 that performs arithmetic and logical computations, such as a microprocessor as known in the art. The computer system 200 also includes a volatile memory 220 for storing data temporarily, such as random access memory (RAM) as known in the art. The computer system 200 has a non-volatile memory 230 for storing data permanently, such as a hard disk drive as known in the art. The computer system 200 further has peripheral interfaces. Output interfaces 240 connect to output devices 242 for providing information from the computer system 200 to the outside world. The output devices 242 may include, for example, a video display and speakers, and the respective output interfaces 240 may be a video socket on a graphics processing unit (GPU) and an audio jack on a sound card. Input interfaces 250 connect to input devices 252 for providing information from the outside world into the computer system 200. The input devices 252 may include, for example, a keyboard and a computer mouse, and the respective input interfaces 250 may be serial, parallel, or universal serial bus (USB) ports. Internally, the functionality of the output interfaces 240 and input interfaces 250 may be provided by one or more integrated circuits, or by the CPU 210.

Figure 3:
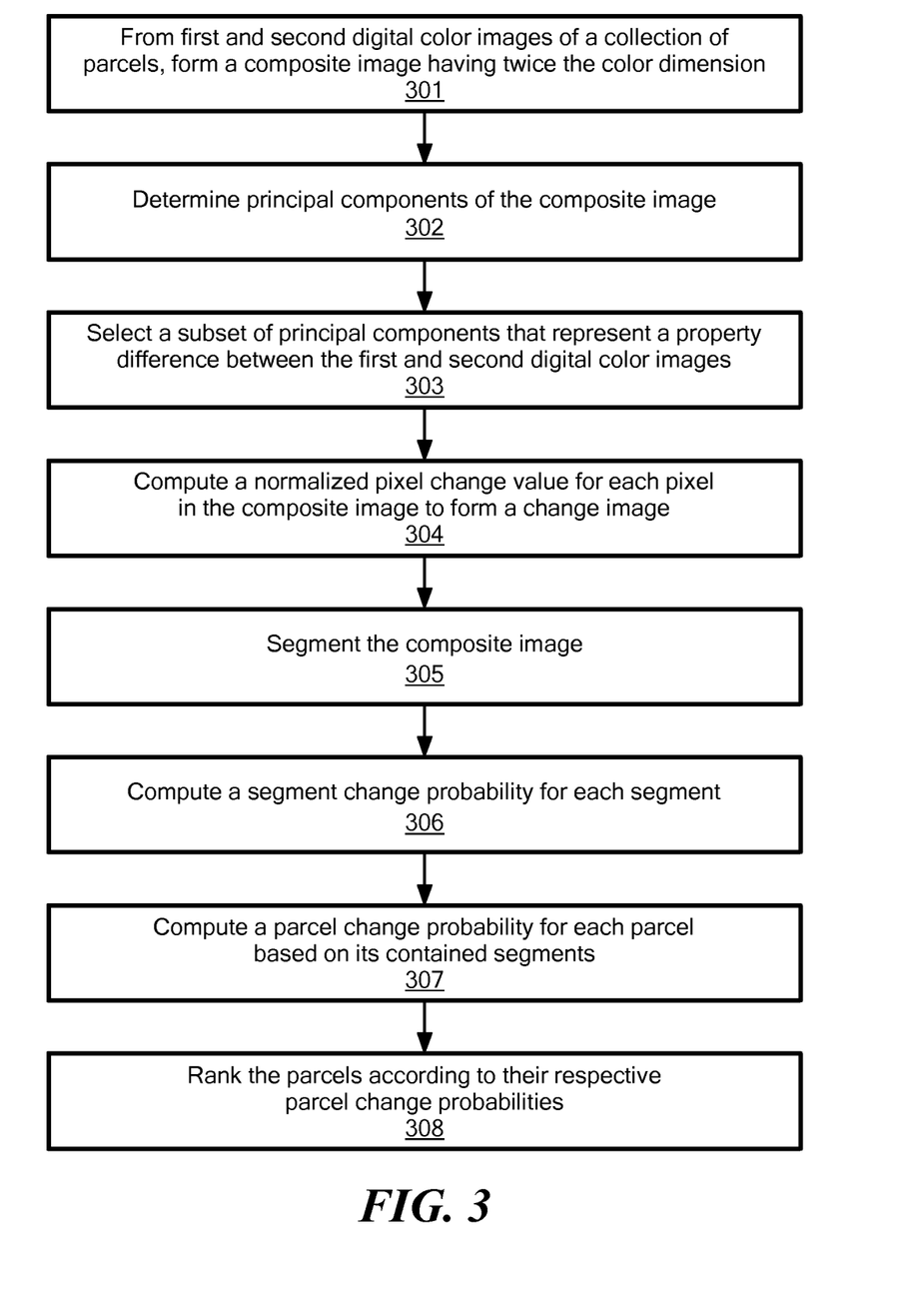
FIG. 3 is a flowchart showing processes for performing a tax assessment according to an embodiment of the invention.

FIG. 3 is a flowchart showing processes for performing a tax assessment according to an embodiment of the invention. The tax assessment method of FIG. 3 includes eight processes, although variations on the method may include additional or optional processes described below, or perform these processes in a different order. In typical embodiments of the invention, the method is performed by hardware, firmware, software, or a combination of these, inside a computer system 200. While for concreteness the processes of FIG. 3 are described herein in the context of performing a tax assessment, it should be appreciated by one of ordinary skill in the art that the inventive concepts may be applied in other contexts where it is desired to determine meaningful change between two images.

In a preferred embodiment of the invention, two digital color images are loaded into a computer system prior to beginning the processes of FIG. 3. In particular, a first digital color image represents a "before" image, while a second digital color image represents an "after" image for comparison. The images represent an appearance of a municipality at different times. Thus, the first image may represent the municipality at a time for which tax has been assessed, while the second image may represent the municipality at a time for which tax has not been assessed. In particular, if the municipality conducts tax assessments in a particular month of the year, but not necessarily every year, then the first and second digital color images may represent appearances of the municipality that are approximately a whole number of years apart. The images are registered (aligned), for example as shown in FIG. 1.

Each digital image uses a color model that includes a number N of colors. Thus, for example, if each pixel may be described by three colors (e.g. red, green, and blue), then N=3 for the color model, and each pixel may be thought of as describing a three-dimensional vector whose coordinates are the RGB color values. If infrared data are also included in each pixel, then N=4 and each pixel describes a four-dimensional vector whose coordinates are RGB IR color values. It should be appreciated that, while three or four colors are typical, the inventive concepts may be applied to any number of colors; that is, a color model having an arbitrary value of N.

In process 301, the computer system forms a composite image from the first and second digital color images. The composite image has twice the color dimension; that is, if the first and second images each have a color dimensionality of N, the composite image has 2N color dimensions. Process 301 may be performed by concatenating the color data for each pixel in the first image with the color data for the corresponding registered pixel in the second image to form a 2N-dimensional vector. Taking the origin as a base point, each such vector defines a data point in a 2N-dimensional color model. Taken together, the collection of pixels in the composite image form a set of such data points in a 2N-dimensional space. Each such data point simultaneously encodes the colors of two registered pixels, one from the first image and one from the second image.

At this stage, an optimization includes optionally compensating for shadows. A pixel in shadow may be detected if the brightness, or intensity, of the pixel is low. As each pair of images may have different lighting conditions, it is advantageous to provide a shadow threshold value, below which pixels are excluded from further processing. Moreover, once a pixel in one digital color image has been determined to lie in shadow, its corresponding registered pixel (and thus the corresponding pixel in the composite image) may be discarded. Thus, the method includes optionally removing from the composite image those pixels having a brightness or intensity that is less than a shadow threshold value.

In process 302, the computer system determines a set of principal components of the data points of the remaining pixels in the composite image using a principal component analysis, or PCA, as that phrase is known in the art. PCA may be thought of as finding preferred directions in data that describe how wide the data is. Each such preferred direction corresponds to some feature of the data. The output of process 302 is a new, rotated coordinate system in the 2N-dimensional color model, whose axes do not necessarily represent colors, but rather linear combinations of colors that represent features of the digital images. Many algorithms for performing PCA are known in the art; as the choice of algorithm may affect the performance of the computation, embodiments of the invention may use whichever algorithm is most efficient given the hardware constraints of the computer system.

In the context of the present invention, the first principal component in the 2N-dimensional color model usually corresponds to an overall scene brightness, which is a correlation between the first and second digital images. To understand this, note that the two images are most easily visually compared when they are taken at the same time of day and from the same angle, so that corresponding registered pixels are roughly as bright as each other. Therefore, the correlation in brightness provides a strong signal in the 2N-dimensional color model. Similarly, the second principal component usually corresponds to a difference in scene brightness between the two images. In contrast to the first principal component, the second principal component in this case represents a difference, rather than a correlation, between the first digital color image and the second digital color image, and is therefore suggestive of a meaningful change between the images.

In many cases, the third principal component represents a correlation between the pixel colors. As might be expected, registered pixels typically represent the same land cover, and the color of most of the land cover is unlikely to differ between the images. Thus, a strong correlation is likely to exist in the composite image, but perhaps not as strong as the correlation between overall scene brightness. Similarly, the fourth principal component may represent a difference between the colors of registered pixels, and thus may be suggestive of a meaningful change between the images.

It should be appreciated that this description of principal components is illustrative only; each comparison of digital images using process 302 may produce principal components that correspond to other features of the images. It also should be appreciated that the principal components that represent a difference between the two images, rather than a correlation, need not be the second and fourth principal components, but rather that the differential principal components may be a different subset. In any event, as can be seen from the above discussion, some principal components represent correlations between the first and second digital color images, while others represent differences.

In process 303, the computer system selects the principal components in the rotated coordinate system that each represent a difference, rather than a correlation, between the first digital color image and the second digital color image. While a human may be able to easily discern which principal components represent differences, a computer system must rely upon a heuristic.

A two step procedure to select them is now described. The procedure operates not on the principal components themselves, but on a 2N-by-2N linear transformation matrix that rotates the coordinate system defined by the original 2N color bands into the coordinate system defined by the 2N principal components by matrix multiplication. This transformation matrix has coefficients or weights that represent how much of each original color band is present in a corresponding principal component.

First, form a first N-dimensional portion (vector) of the coefficients of the transformation matrix that correspond to the first image, and form a second N-dimensional portion (vector) of the coefficients of the transformation matrix that correspond to the second image. Since the change image color values were formed by concatenation in process 301, this step involves separating the 2N coefficients of a column of the transformation matrix into two N-dimensional vectors. It should be appreciated that the first vector and the second vector represent portions of a linear transformation, and do not correspond directly to any color data present in any pixel of either of the original images.

Next, subtract the first vector from the second vector to obtain a difference vector. If the first and second vectors have coordinates that are similar in magnitude and sign, then the difference vector will have a small magnitude indicating correlation, while if the first and second vectors have coordinates that are opposite in sign, then the difference vector will have a large magnitude indicating change. Thus, the N-dimensional length of the difference vector is a measure of how much the principal component represents change. In practice, comparison of the length of the difference vector against a given length provides a binary test that selects a subset of the principal components that represent difference, rather than correlation. The given length may be, for example, a length of one (1) if the color values are scaled to be between zero (0) and one (1). It should be appreciated that other lengths may be used, and other procedures to implement process 303 may be used.

It is worth noting at this point that the number of principal components selected by process 303 is a smaller number than the total number (2N) of principal components. Because each principal component potentially represents a meaningful change, it follows that digital color images having more color bands (that is, a higher value of N) potentially produce more opportunities to detect that change. This observation follows from the fact that color images containing more color data contain more correlations and more differences between those data. However, effective results may be obtained using even panchromatic images for which N=1; in such images, the first principal component represents a coarse correlation between the images, and the second principal component represents a coarse difference between the images.

Next, process 304 computes, for each pixel in the composite image, a normalized pixel change value as a function of the coordinates of the pixel color data along each principal component in the subset produced by process 303. This process 304 may be implemented by taking the maximum value of the coordinates of the pixel along the selected subset (which represent difference), while ignoring the coordinates of the pixel along the other principal components (which represent correlation).

The normalized pixel change values collectively define a change image having a one-dimensional color model. This change image may be visualized as a grayscale image that represents meaningful change between the first and second digital color images. That is, the results of processes 301 to 304 first maps each pixel in the 2N-dimensional composite image to an lower-dimensional subspace, then to a single (1-dimensional) normalized pixel change value. Each pixel in the composite image shares a spatial relationship with every other pixel that is defined by the registration between the first and second color images, and this relationship may be applied to the normalized pixel change values to produce a change image having a single "color" dimension.

It should be appreciated that, having performed processes 301 to 304, one has already obtained useful information about the meaningful change between the first and second digital color images, in the form of a grayscale change image. Registration of this change image to the first and second images provides an advantageous method of comparing the original two images. In particular, pixels of the change image with a high "intensity" represent large changes between the respective registered pixels in the first and second digital color images.

However, for purposes of illustrating a particular application of this change image, the method of FIG. 3 continues with four additional processes that are useful in performing a tax assessment. Thus, for the remainder of the description of FIG. 3, it will be assumed that the physical object shown by the images is a municipality, the first digital color image represents an appearance of the municipality at a first time (e.g., about the time of a previous tax assessment), the second digital color image represents an appearance of the municipality at a second time (e.g., a recent time), and the municipality is divided into a plurality of parcels.

In process 305, the computer system divides the change image into a number of segments that each contain pixels sharing a common visual property. Ideally the common property relates to the type of land cover (e.g., grass or a roof), so that each segment represents those pixels that image a contiguous area having the same type of land cover. Many algorithms for segmenting digital images are known in the art, such as forming thresholds, clustering, compressing, forming histograms, detecting edges, growing regions, partitioning graphs, and so on. It should be appreciated that the scope of the invention is not necessarily limited by the choice of segmenting algorithm. In illustrated embodiments, membership of each pixel in a segment is determined as a function of its normalized pixel change value. Thus, for example, two neighboring pixels might be in the same segment if their normalized pixel change values are within a certain percentage of each other.

Each segment is formed from contiguous pixels. Because the segments are contiguous, each defines a shape that advantageously may be visualized in a graphical user interface using vector graphics. Each segment lies entirely within a single parcel in the plurality of parcels, although different segments may lie within different parcels. Thus, the segments that are formed by process 305 may be used in subsequent computations to determine an overall parcel change probability.

In process 306, the computer system computes a segment change probability for each segment as a function of the normalized pixel change values of the pixels that form it. This segment change probability may be viewed as a "zonal average" of the change values of the pixels constituting the segment. By performing this zonal average, each segment is endowed with a single number that represents a normalized measure of the change between the first digital image and the second digital image on a segment-by-segment basis, rather than a pixel-by-pixel basis.

At this stage, one optimization includes optionally eliminating segments that have a segment change probability below a segment change threshold value. Thus, one advantageously may instruct the computer system that certain segments representing an insignificant change should be excluded from further consideration. Such instruction may take the form of a control in a graphical user interface, for example as a slider bar.

A further optimization includes optionally eliminating segments that consist of a number of pixels representing an area having less than a given number of square feet according to a segment size threshold value. Thus, one advantageously may instruct the computer system that certain small segments should be excluded from further consideration, even if they represent a meaningful change. Such instruction also may take the form of a control in a graphical user interface.

In process 307, the computer system computes a parcel change probability for each parcel as a function of the segment change probabilities of the segments that lie within it. As pixel change values were averaged to produce a segment change value in process 306, process 307 averages the segment change values to produce a parcel change value. However, while each pixel in the composite image represents the same amount of geographic area, segments may vary in size, so a small adjustment must be made to the averaging process.

Therefore, in one embodiment of the invention, the parcel change probability for each parcel is computed as a sum of the segment change probabilities weighted by their respective areas. That is, the parcel change probability is the sum, over each segment that lies within a given parcel, of the product of the segment change probability of the given segment and the ratio between the number of pixels in the given segment and the number of pixels in the parcel that contains the given segment. It should be appreciated that other methods of computing a parcel change probability may be employed without deviating from the inventive concept.

Finally, in process 308, the computer system ranks the parcels according to their respective parcel change probabilities, thereby providing a suggested order for tax assessors to visit the parcels to perform a tax assessment. While this ranking may be performed using conventional sorting means, it should be appreciated that the scope of the invention is not limited by the choice of sorting algorithm. Any such algorithm may be chosen to optimize the efficiency of the ranking process.

Some embodiments of the invention provide a graphical user interface (GUI) for the computer system. A screenshot of one such GUI is provided in FIG. 1; another is provided in FIG. 4, described below. The GUI may display a portion of the first digital color image next to a corresponding, registered portion of the second digital color image to permit a tax assessor using the computer system to visually compare the portions. In particular, the GUI may simultaneously display distinctive outlines of parcels that are defined by registered portions of the two images to facilitate comparison. Also, the GUI may include a control that permits the tax assessor to adjust the shadow threshold value, the segment change probability threshold value, or segment size threshold value.

Figure 4:
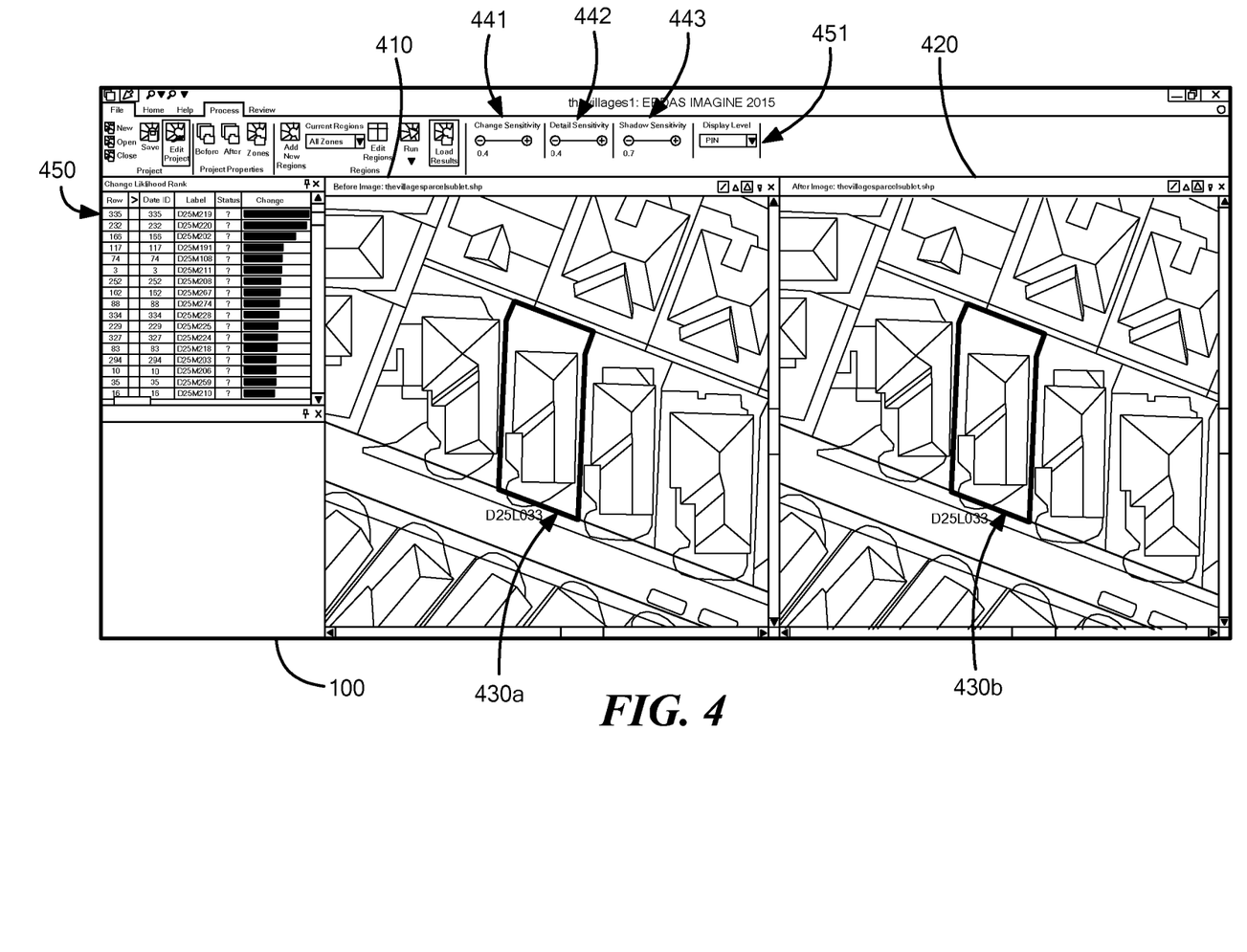
FIG. 4 is a representation of the GUI of FIG. 1, showing a list of parcels ranked according to their respective parcel change probabilities and a particular parcel selected from the list.

FIG. 4 is a representation of the graphical user interface 100 of FIG. 1, showing a list of parcels ranked according to their respective parcel change probabilities and a particular parcel selected from the list. Several features described above can be seen in FIG. 4. In particular, a first digital color image 410 and a second, registered digital color image 420 are visible. Images 410 and 420 represent zoomed views of the "before" image 110 and "after" image 120, respectively, to permit close inspection of a small number of parcels. A given parcel is distinctively outlined within a portion 430a of the first digital color image and within the corresponding portion 430b of the second digital color image.

Three sensitivity controls are provided in the embodiment of FIG. 4. A change sensitivity control 441 permits the tax assessor or other user to specify the segment change probability threshold value. A detail sensitivity control 442 permits the user to specify the segment size threshold value. A shadow sensitivity control 443 permits the user to specify the shadow threshold value.

A list of parcels 450, ranked by their likelihood of change, is also visible in the GUI. The parcels are identified using various descriptive information, such as their geographic coordinates, unique parcel identifier numbers, or other such data that may be selectable using a display label control 451. Displayed next to each identifier in this embodiment is a status indicator whose function is explained in connection with FIGS. 5-9, and a "change" bar whose length visually indicates the parcel change probability computed for that parcel using the method described in connection with FIG. 3. Each column of data may be sorted according to a preference of the user. Thus, the parcels may be advantageously sorted in descending order of their respective parcel change probabilities, as shown in FIG. 4. Thus, the user may proceed to consider parcels in the order suggested by this sorting.

Figure 5:
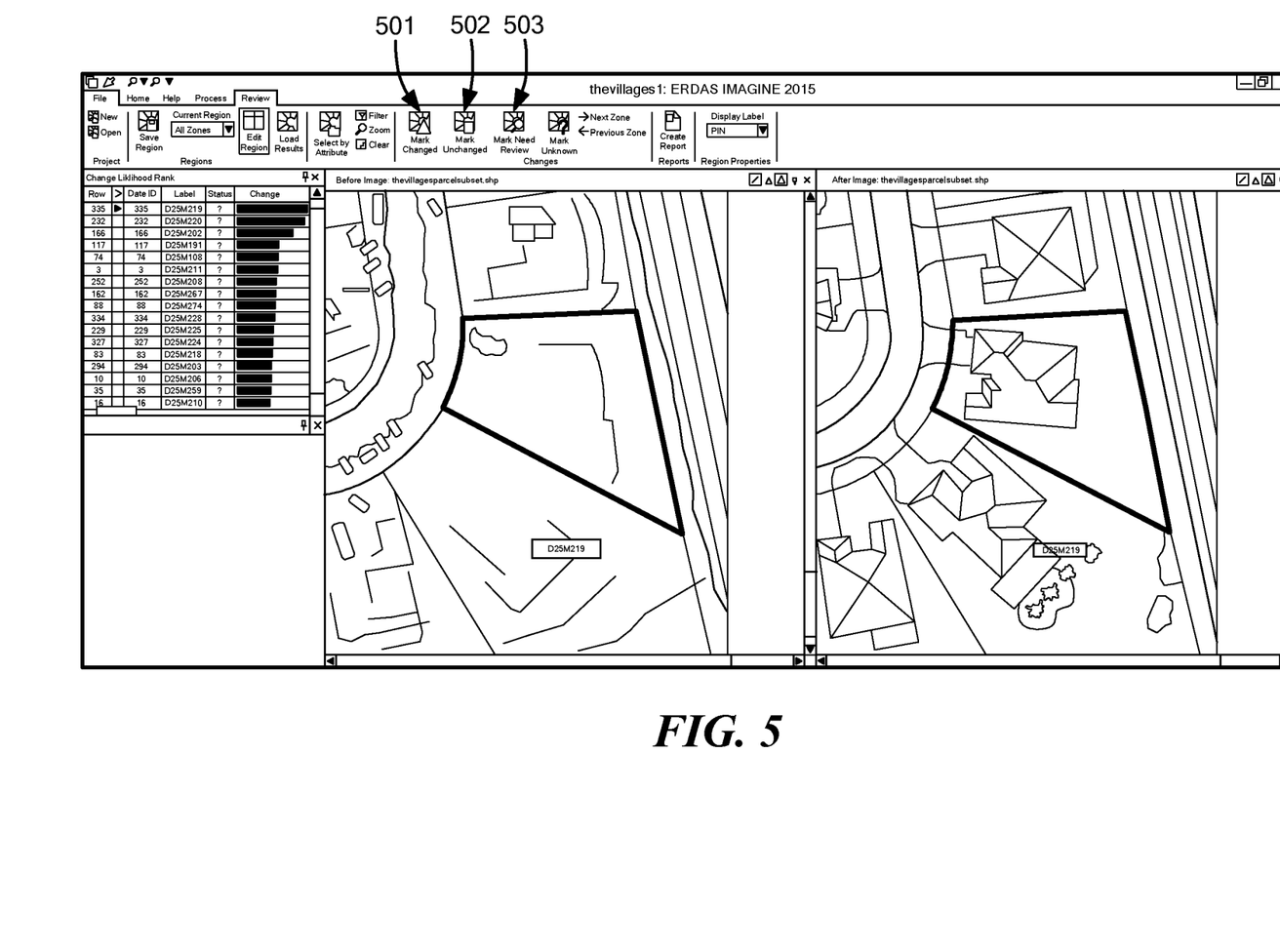
FIG. 5 shows the GUI displaying a first parcel having a high parcel change probability prior to visual analysis by an analyst.
Figure 6:
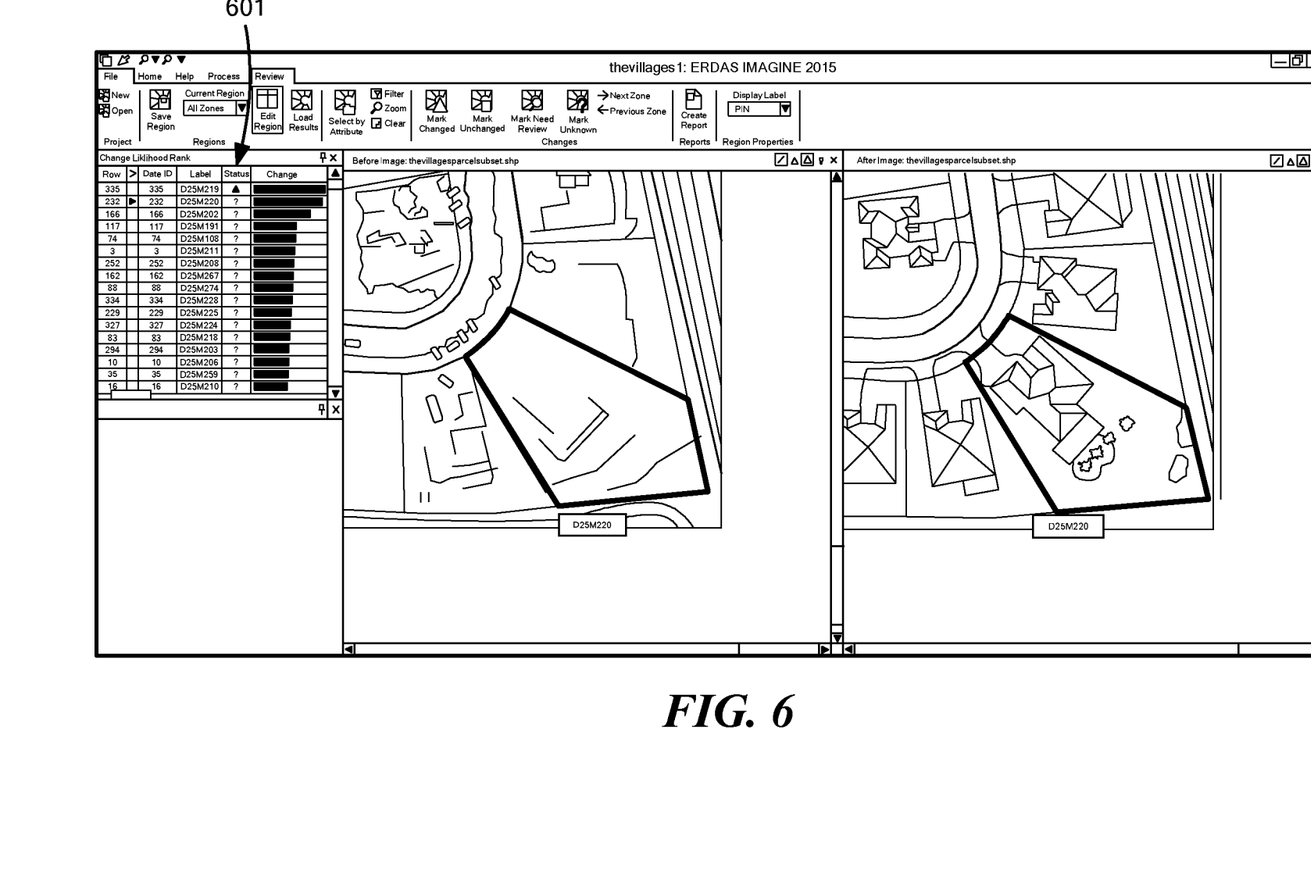
FIG. 6 shows the GUI displaying a second parcel having a high parcel change probability after the analyst has marked the first parcel as having significantly changed for the purposes of conducting a tax assessment.
Figure 7:
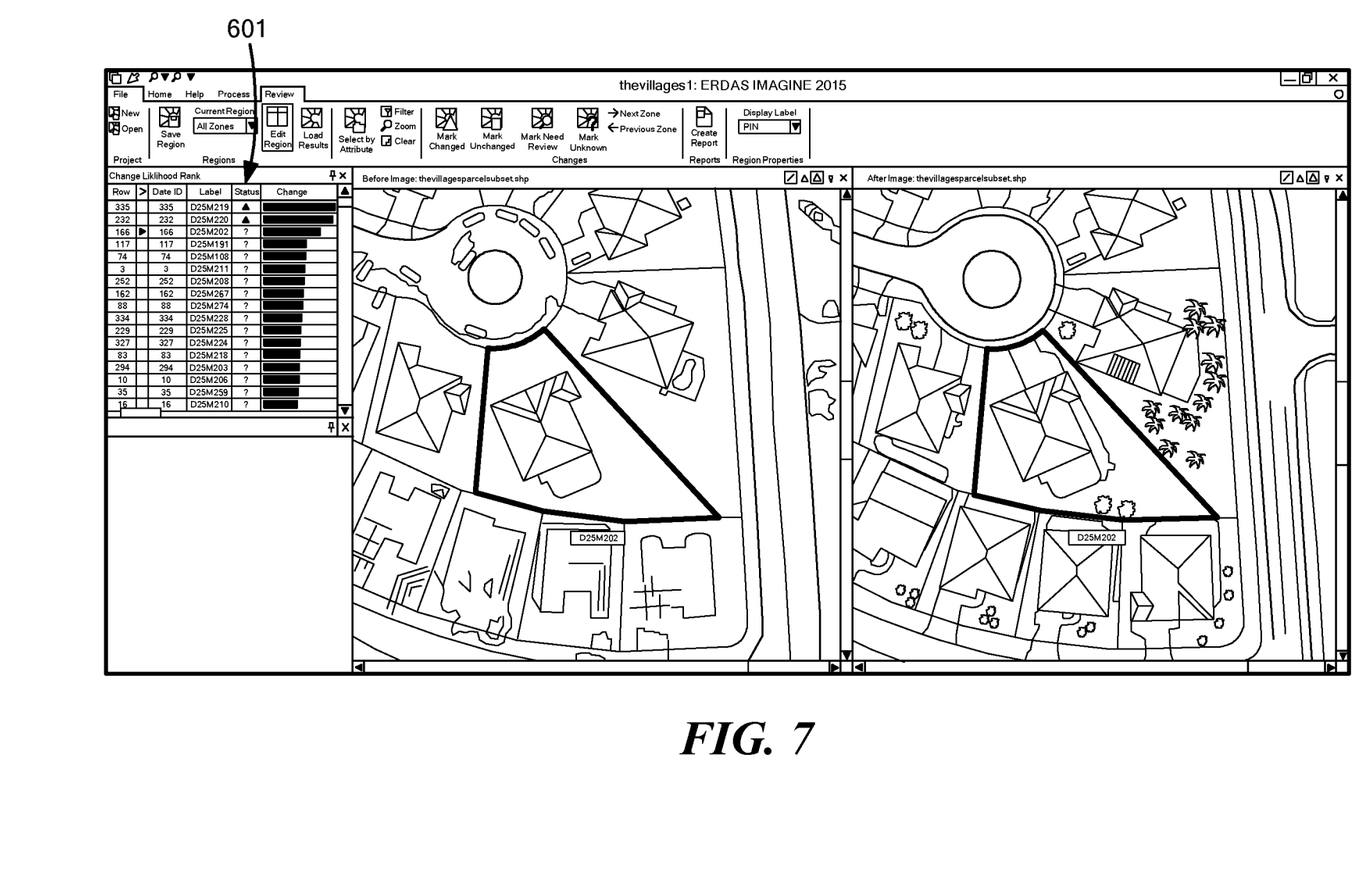
FIG. 7 shows the GUI displaying a third parcel having a high parcel change probability after the analyst has marked the second parcel as having significantly changed for the purposes of conducting a tax assessment.

FIGS. 5-7 show the three parcels having the highest change probabilities. In particular, FIG. 5 shows the GUI displaying a first parcel having a high parcel change probability prior to visual analysis. Each parcel status is unknown, as indicated by a question mark in the "status" column of the ranked list of parcels. The analyst performs a visual comparison of just the indicated parcel, and operates one of several controls based on the analysis. Thus, if the parcel appears to the analyst to have significantly changed for the purposes of conducting a tax assessment, the analyst may operate the "mark changed" control 501. Or, if the parcel appears not to have significantly changed, the analyst may operate the "mark unchanged" control 502. If further analysis is required, the analyst may operate the "mark need review" control 503. In this case, the parcel obviously has been improved, so the analyst operates the first control 501. In accordance with a particularly efficient embodiment of the invention, operation of any of the controls 501, 502, 503 advances the visualization to the next parcel.

FIG. 6 shows the GUI displaying a second parcel having a high parcel change probability after the analyst has marked the first parcel as having significantly changed. In accordance with one embodiment of the invention, marking the first parcel has caused a "changed" triangle to appear in the "status" column 601 of the list of ranked parcels. This triangle indicates that the parcel has been analyzed and determined to have changed. In some embodiments, the triangle may be colored a suggestive color, for example green, to indicate that a positive match was determined by the analyst. FIG. 7 shows the GUI displaying a third parcel having a high parcel change probability after the analyst has marked the second parcel as having significantly changed. Notice that the "status" column 601 now has two triangles.

Figure 8:
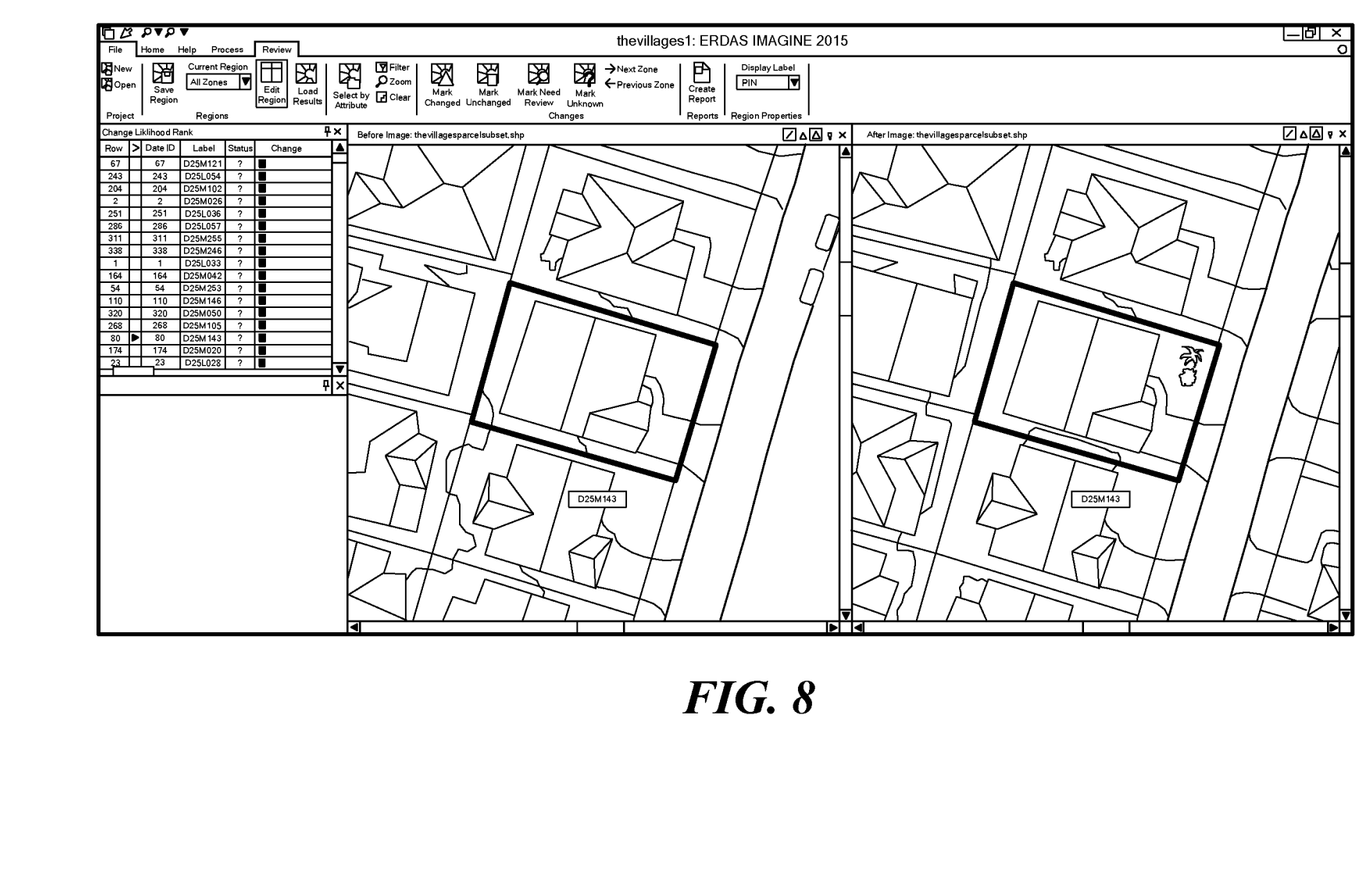
FIG. 8 shows the GUI displaying a fourth parcel that has a low parcel change probability prior to visual analysis.

FIG. 8 shows the GUI displaying a fourth parcel that has a low parcel change probability prior to visual analysis. Note how the "change" bar is much shorter for the indicated parcel than for the parcels shown in FIGS. 5-7, representing a much lower probability that the parcel has meaningfully changed between the two digital images. A tax analyst may consider that the visual changes do not represent any meaningful change, and operate the "mark unchanged" control. The results are shown in FIG. 9, which shows the GUI displaying a fifth parcel that has a low parcel change probability after the analyst has marked the fourth parcel as having not significantly changed.

Figure 9:
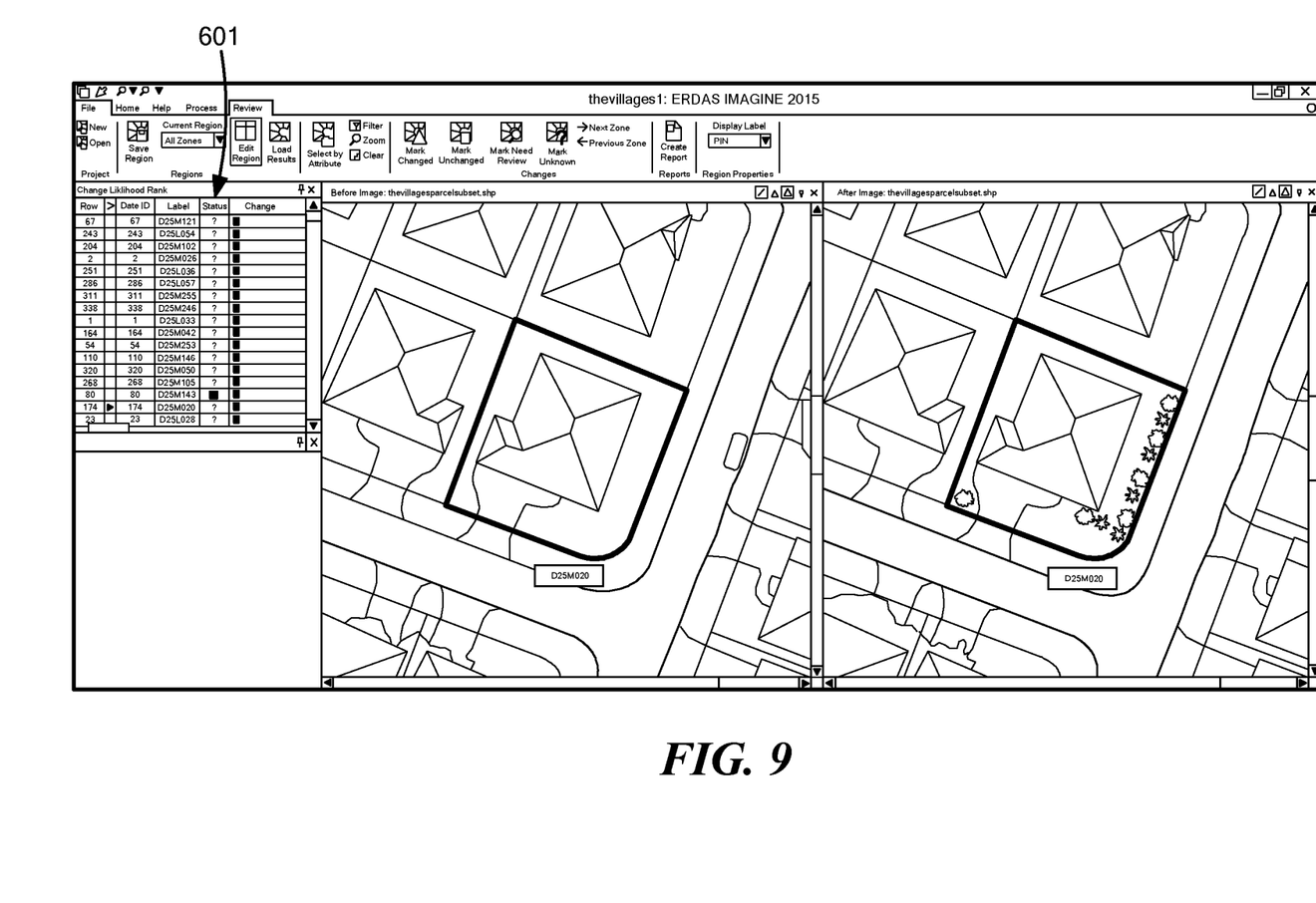
FIG. 9 shows the GUI displaying a fifth parcel that has a low parcel change probability after the analyst has marked the fourth parcel as having not significantly changed for the purposes of conducting a tax assessment.

Note in FIG. 9 the appearance of a square in the status column 601 for the fourth parcel that has now been marked "unchanged". This square indicates that the parcel has been analyzed and determined not to have changed. In some embodiments, the square may be colored a suggestive color, for example red, to indicate that a negative match was determined by the analyst.

It should be appreciated that various embodiments of the invention may include other features, such as the ability to record analyst determinations in files that are interoperable with other computer systems and programs. A person having ordinary skill in the art may appreciate other modifications to the computer system or the GUI that nevertheless use the inventive concepts herein described.

The embodiments of the invention described above are intended to be merely exemplary; numerous variations and modifications will be apparent to those skilled in the art. All such variations and modifications are intended to be within the scope of the present invention as defined in any appended claims.

It should be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

What is claimed is:

1. A method of comparing first and second digital color images having registered pixels, each pixel having data for N colors, the first digital color image having an appearance of a physical activity or object at a first time, the second digital color image having an appearance of the physical activity or object at a second time, the method comprising:
   forming a composite image having pixels in a 2N-dimensional color model by defining color data for each pixel in the composite image as a concatenation of the color data for a pixel in the first digital color image with the color data for a registered pixel in the second digital color image;
   determining a set of principal components of the composite image using a principal component analysis, the set of principal components defining a coordinate system in the 2N-dimensional color model;
   selecting a subset of principal components in the coordinate system as those principle components that each represent a difference, rather than a correlation, between the first digital color image and the second digital color image; and
   for each pixel in the composite image, computing a normalized pixel change value as a function of the coordinates of the pixel color data along each principal component in the subset, the normalized pixel change values collectively defining a change image having a one-dimensional color model, the computed normalized pixel change value for each pixel measuring a change in the physical activity or object between the first time and the second time.

2. A method according to claim 1, wherein N=3 and each pixel has red, green, and blue (RGB) color data.

3. A method according to claim 1, wherein N=4 and each pixel has red, green, blue, and infrared (RGB IR) color data.

4. A method according to claim 1, wherein selecting the subset of principal components comprises, for each principal component of the composite image, (a) forming an N-dimensional difference vector by subtracting a first N-dimensional portion of the principal component that represents the first digital color image from a second N-dimensional portion of the principal component that represents the second digital color image, and (b) selecting the principal component for inclusion in the subset if and only if the N-dimensional length of the difference vector is greater than a given length.

5. A method according to claim 1, wherein the normalized pixel change value for each pixel is computed to be the maximum of the coordinates of the color data of the pixel along each principal component in the subset.

6. A method according to claim 1, further comprising, prior to determining the set of principal components of the composite image, removing from the composite image those pixels having a brightness that is less than a shadow threshold value.

7. A method according to claim 1, wherein the physical activity or object is a municipality, the first digital color image represents an appearance of the municipality at a first time, the second digital color image represents an appearance of the municipality at a second time, and the municipality is divided into a plurality of parcels, the method further comprising:
   dividing the change image into a plurality of segments, wherein (a) each given segment in the plurality of segments is formed from contiguous pixels and lies entirely within a parcel in the plurality of parcels, and (b) membership, in the given segment, of each pixel is determined as a function of its normalized pixel change value;

computing, for each segment in the plurality of segments, a segment change probability as a function of the normalized pixel change values of the pixels that form it;

computing, for each parcel in the plurality of parcels, a parcel change probability as a function of the segment change probabilities of the segments that lie within it; and ranking the parcels in the plurality of parcels according to their respective parcel change probabilities.

8. A method according to claim 7, wherein the first digital color image and the second digital color image represent appearances of the municipality that are approximately a whole number of years apart.

9. A method according to claim 7, wherein the segment change probability for each segment in the plurality of segments is computed to be the average of the normalized pixel change values of the pixels that form it.

10. A method according to claim 7, further comprising, prior to computing the parcel change probability, eliminating segments that have a segment change probability below a segment change threshold value.

11. A method according to claim 7, further comprising, prior to computing the parcel change probability, eliminating segments that consist of a number of pixels representing an area having a number of square feet below a segment size threshold value.

12. A method according to claim 7, wherein the parcel change probability for each parcel in the plurality of parcels is computed as the sum, over each segment that lies within the given parcel, of the product of the segment change probability of the given segment and the ratio between the number of pixels in the given segment and the number of pixels in the parcel that contains the given segment.

13. A method according to claim 7, further comprising providing a graphical user interface (GUI) for a computer system, the GUI displaying a portion of the first digital color image next to a corresponding portion of the second digital color image to permit visual comparison of the portions by a user of the computer system.

14. A method according to claim 13, further comprising simultaneously displaying in the GUI (a) a distinctive outline of a parcel within the portion of the first digital color image, (b) a distinctive outline of the parcel within the corresponding portion of the second digital color image, and (c) a control for receiving a selection indicating that the parcel has meaningfully changed, has not meaningfully changed, or requires further analysis.

15. A method according to claim 13, further comprising providing in the GUI a control that permits the user to adjust a shadow threshold value, a segment change threshold value, or a segment size threshold value.

16. A non-transitory, tangible computer readable storage medium on which is stored computer program code for comparing first and second digital color images having registered pixels, each pixel having data for N colors, the first digital color image having an appearance of a physical activity or object at a first time, the second digital color image having an appearance of the physical activity or object at a second time, the storage medium including program code for:

forming a composite image having pixels in a 2N-dimensional color model by defining color data for each pixel in the composite image as a concatenation of the color data for a pixel in the first digital color image with the color data for a registered pixel in the second digital color image;

determining a set of principal components of the composite image using a principal component analysis, the set of principal components defining a coordinate system in the 2N-dimensional color model;

selecting a subset of principal components in the coordinate system as those principle components that each represent a difference, rather than a correlation, between the first digital color image and the second digital color image; and for each pixel in the composite image, computing a normalized pixel change value as a function of the coordinates of the pixel color data along each principal component in the subset, the normalized pixel change values collectively defining a change image having a one-dimensional color model, the computed normalized pixel change value for each pixel measuring a change in the physical activity or object between the first time and the second time.

17. A storage medium according to claim 16, wherein the program code for selecting the subset of principal components comprises program code for, for each principal component of the composite image, (a) forming an N-dimensional difference vector by subtracting a first N-dimensional portion of the principal component that represents the first digital color image from a second N-dimensional portion of the principal component that represents the second digital color image, and (b) selecting the principal component for inclusion in the subset if and only if the N-dimensional length of the difference vector is greater than a given length.

18. A storage medium according to claim 16, wherein the program code for computing the normalized pixel change value for each pixel comprises program code for selecting the maximum of the coordinates of the color data of the pixel along each principal component in the subset.

19. A storage medium according to claim 16, wherein the program code for computing the normalized pixel change value for each pixel comprises program code for averaging the coordinates of the color data of the pixel along each principal component in the subset.

20. A storage medium according to claim 16, wherein the program code further comprises program code for, prior to determining the set of principal components of the composite image, removing from the composite image those pixels having a brightness that is less than a shadow threshold value.

21. A storage medium according to claim 16, wherein the physical activity or object is a municipality, the first digital color image represents an appearance of the municipality at a first time, the second digital color image represents an appearance of the municipality at a second time, and the municipality is divided into a plurality of parcels, the storage medium further including program code for:

dividing the change image into a plurality of segments, wherein (a) each given segment in the plurality of segments is formed from contiguous pixels and lies entirely within a parcel in the plurality of parcels, and (b) membership, in the given segment, of each pixel is determined as a function of its normalized pixel change value;

computing, for each segment in the plurality of segments, a segment change probability as a function of the normalized pixel change values of the pixels that form it;

computing, for each parcel in the plurality of parcels, a parcel change probability as a function of the segment change probabilities of the segments that lie within it; and ranking the parcels in the plurality of parcels according to their respective parcel change probabilities.

22. A storage medium according to claim 21, wherein the program code for computing the segment change probability for each segment in the plurality of segments comprises program code for computing the average of the normalized pixel change values of the pixels that form it.

23. A storage medium according to claim 21, further comprising program code for, prior to computing the parcel change probability, eliminating segments that have a segment change probability below a segment change threshold value.

24. A storage medium according to claim 21, further comprising program code for, prior to computing the parcel change probability, eliminating segments that consist of a number of pixels representing an area having a number of square feet below a segment size threshold value.

25. A storage medium according to claim 21, wherein the program code for computing the parcel change probability for each parcel in the plurality of parcels comprises program code for computing the sum, over each segment that lies within the given parcel, of the product of the segment change probability of the given segment and the ratio between the number of pixels in the given segment and the number of pixels in the parcel that contains the given segment.

26. A storage medium according to claim 21, further comprising program code for providing a graphical user interface (GUI) for a computer system, the GUI displaying a portion of the first digital color image next to a corresponding portion of the second digital color image to permit visual comparison of the portions by a user of the computer system.

27. A storage medium according to claim 26, further comprising program code for simultaneously displaying in the GUI (a) a distinctive outline of a parcel within the portion of the first digital color image, (b) a distinctive outline of the parcel within the corresponding portion of the second digital color image, and (c) a control for receiving a selection indicating that the parcel has meaningfully changed, has not meaningfully changed, or requires further analysis.

28. A storage medium according to claim 26, further comprising program code for providing in the GUI a control that permits the user to adjust a shadow threshold value, a segment change threshold value, or a segment size threshold value.

29. A computer system for comparing first and second digital color images having registered pixels, each pixel having data for N colors, the first digital color image having an appearance of a physical activity or object at a first time, the second digital color image having an appearance of the physical activity or object at a second time, the computer system comprising:
- a volatile memory having stored within it computer program code for:
  - forming a composite image having pixels in a 2N-dimensional color model by defining color data for each pixel in the composite image as a concatenation of the color data for a pixel in the first digital color image with the color data for a registered pixel in the second digital color image;
  - determining a set of principal components of the composite image using a principal component analysis, the set of principal components defining a coordinate system in the 2N-dimensional color model;
  - selecting a subset of principal components in the coordinate system as those principle components that each represent a difference, rather than a correlation, between the first digital color image and the second digital color image; and
  - for each pixel in the composite image, computing a normalized pixel change value as a function of the coordinates of the pixel color data along each principal component in the subset, the normalized pixel change values collectively defining a change image having a one-dimensional color model, the computed normalized pixel change value for each pixel measuring a change in the physical activity or object between the first time and the second time;
- a microprocessor, coupled to the volatile memory, configured to execute the computer code stored in the volatile memory;
- one or more output interfaces, coupled to the microprocessor, for providing a graphical user interface that displays a portion of the first digital color image next to a corresponding portion of the second digital color image to permit visual comparison of the portions by a user of the computer system; and
- one or more input interfaces, coupled to the microprocessor, for receiving a selection indicating that the displayed portions have meaningfully changed, have not meaningfully changed, or require further analysis.

* * * * *